Aug. 11, 1964     F. GASCHE     3,144,163
SEAL
Filed May 18, 1962
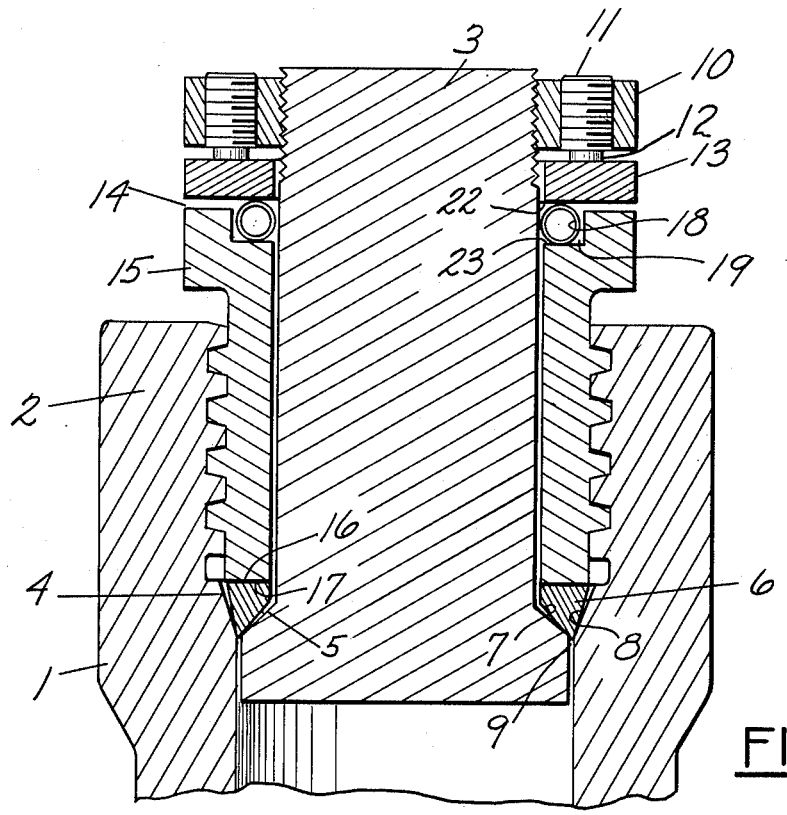
FIG. 1
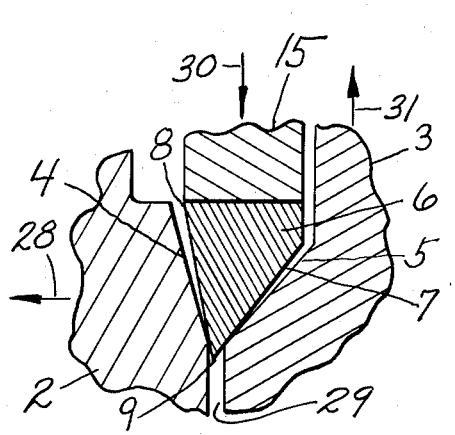
FIG. 2
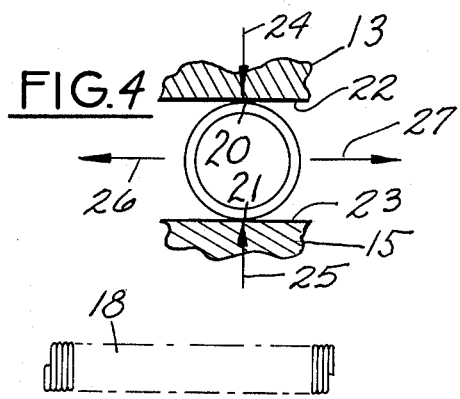
FIG. 4
FIG. 3
INVENTOR.
BY Fred Gasche
Ralph Hammar
Attorney

3,144,163
SEAL
Fred Gasche, Erie, Pa., assignor to Autoclave Engineers, Inc., Erie, Pa., a corporation of Pennsylvania
Filed May 18, 1962, Ser. No. 195,716
3 Claims. (Cl. 220—46)

This invention is a seal for pressure vessels and the like which accommodates differential thermal expansion.

In the drawing, FIG. 1 is a section through one end of a pressure vessel, FIG. 2 is an enlarged section illustration of the operation, FIG. 3 is a view of a length of coil spring through which pressure is transmitted to the gasket and FIG. 4 is a diagrammatic view illustrating the pressure transmitting action of the coil spring.

In the drawing, 1 indicates the body of a pressure vessel having an open end 2 within which is telescoped a cover 3. The body 1 has an axially presented inwardly inclined seat 4. The cover has an axially presented outwardly inclined seat 5. The seats 4 and 5 radially are spaced apart and converge toward each other or away from the open end of the vessel. Between the seats 4 and 5 is an annular metal gasket 6 having surfaces 7 and 8 converging toward a point 9 and respectively cooperating with the converging seats 5 and 4. The included angle between the surfaces 7 and 8 is less than the included angle between the seats 4 and 5 and the taper of the surfaces 7 and 8 is so related to the taper of the seats 4 and 5 that sealing contact occurs adjacent the point 9. This provides effectively line contact between the seat 4 and surface 8 and between the seat 5 and the surface 7.

Sealing pressure is applied to the gasket 6 from a collar 10 screwed on the upper end of the cover 3 and having a plurality of set screws 11 within ends 12 engaging a pressure ring 13. Tightening of the set screws 11 forces the pressure ring 13 toward the outer or upper end 14 of a sleeve 15 screwed into the open end 2 of the pressure vessel body. The inner or lower end 16 of the sleeve bears against the outer end 17 of the gasket 6. The sealing pressure is transmitted from the pressure ring 13 to the sleeve 15 through a coil spring 18 coiled around the axis of the pressure vessel and suitably confined, for example, in a groove 19 in the outer end of the sleeve 15. Unlike the usual application of coil springs, the axes of the individual coils extend crosswise of the thrust and diametrically opposite sides 20 and 21 of the coils engage the thrust transmitting and thrust receiving surfaces 22 and 23, the surface 22 being on the pressure ring 13 and the surface 23 being at the bottom of the groove 19.

As shown in FIG. 4, pressure in the direction of arrows 24 and 25 tends to flatten the coils and cause a sidewise movement in the direction of arrows 26 and 27.

In the use of the pressure vessel, there may be differential expansion due not only to the difference in the materials of the cover, body and gasket but also to difference in the temperatures. The effect of differential expansion is illustrated in FIG. 2. Assume that the end 2 of the body is heated at a faster rate than the cover 3 so that the cover is relatively cool. Under these conditions, the body will expand radially outward in the direction of arrow 28, thereby increasing the width of the gap 29 between the body and cover. This differential expansion does not cause leakage of the seal because the coil spring 18 exerts a downward pressure on the sleeve 15 in the direction of arrow 30 and an upward pressure on the cover 3 in the direction of arrow 31. The net effect is to maintain the sealing pressure between the point 9 of the gasket and the adjacent parts of the body and cover.

What is claimed as new is:

1. A seal for pressure vessels and the like having a body with an axially presented inwardly tapered seat within one end, a cover telescoped within said one end of the body and having an axially presented outwardly tapered seat, said seats being radially spaced apart and converging toward each other, an annular gasket having tapered surfaces presented toward and engaging said seats, a pressure sleeve fixed to said one end of the body and having a shoulder engaging said gasket remote from said seats, a pressure ring on the cover having a thrust surface presented toward said sleeve, and a coil spring arranged between the sleeve and said thrust surface with the axes of the coils crosswise of the thrust and with opposite sides of the individual coils in thrust relation respectively to the sleeve and to said thrust surface.

2. In a seal between two members having spaced annular surfaces and an annular gasket interposed between said surfaces, screw clamping means outside the joint for developing sealing pressure between the gasket and said surfaces, said clamping means including a part connected to one of said members, another part connected to the other of said members, and a spring in thrust transmitting relation between said parts, said spring being a coil spring with the axes of the individual coils crosswise of the thrust and with opposite sides of individual coils engaging one and the other of said parts.

3. A seal for pressure vessels and the like having a body with an axially presented seat within one end, a cover telescoped within said one end of the body and having a cooperating seat, an endless gasket between said seats, a pressure means for developing sealing pressure between said seats including a pressure ring and a coil spring in thrust transmitting relation to the ring, the axes of the individual coils of the spring being crosswise of the thrust.

References Cited in the file of this patent
UNITED STATES PATENTS

| 2,424,449 | Gasche | July 22, 1947 |
| 2,726,006 | Brewer et al. | Dec. 6, 1955 |